(12) United States Patent
Howarth et al.

(10) Patent No.: US 7,422,152 B2
(45) Date of Patent: Sep. 9, 2008

(54) METHODS AND DEVICES FOR PROVIDING SCALABLE RFID NETWORKS

(75) Inventors: Arthur G. Howarth, Orleans (CA); Rajiv Singhal, San Jose, CA (US); Bruce Moon, Dublin, CA (US); Roland Saville, Oakland Park, FL (US); Jayesh Chokshi, Cupertino, CA (US); Michael De Leo, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 523 days.

(21) Appl. No.: 11/010,089

(22) Filed: Dec. 9, 2004

(65) Prior Publication Data

US 2005/0252971 A1    Nov. 17, 2005

Related U.S. Application Data

(60) Provisional application No. 60/570,999, filed on May 13, 2004.

(51) Int. Cl.
*G06K 19/06* (2006.01)
*G06K 7/08* (2006.01)
(52) U.S. Cl. .................... 235/451; 235/492
(58) Field of Classification Search ............ 235/451, 235/435, 492; 340/10.3, 5.91, 539.1, 10.1, 340/572.1
See application file for complete search history.

(56) References Cited

U.S. PATENT DOCUMENTS

| 4,688,026 A | 8/1987 | Scribner et al. |
| 5,339,073 A | 8/1994 | Dodd et al. |
| 5,646,616 A | 7/1997 | Komatsu |
| 5,850,187 A | 12/1998 | Carrender et al. |
| 5,887,176 A | 3/1999 | Griffith et al. |
| 6,111,517 A | 8/2000 | Atick et al. |
| 6,115,079 A | 9/2000 | McRae |
| 6,539,281 B2 | 3/2003 | Wan et al. |
| 6,553,489 B1 | 4/2003 | Osler et al. |
| 6,963,282 B1 | 11/2005 | Yeates et al. |
| 7,057,511 B2 | 6/2006 | Shanks et al. |
| 7,064,660 B2 | 6/2006 | Perkins et al. |
| 7,075,412 B1 | 7/2006 | Reynolds et al. |
| 7,081,819 B2 | 7/2006 | Martinez de Velasco Cortina et al. |
| 7,103,886 B2 | 9/2006 | Haller et al. |

(Continued)

OTHER PUBLICATIONS

Johnston, M., DHCP Preboot Execution Environment (PXE) Options draft-ietf-dhc-pxe-options-01.txt, Internet-Draft, Jan. 21, 2005, 7 pages.

(Continued)

*Primary Examiner*—Thien Minh Le
(74) *Attorney, Agent, or Firm*—Weaver Austin Villeneuve & Sampson LLP

(57) ABSTRACT

According to some implementations of the present invention, RFID devices and middleware servers are automatically provisioned with a network address and with instructions for sending a request for a middleware server to a middleware server assigner. In some implementations, the middleware server assigner is a load balancer. In some implementations, a middleware server is associated with a plurality of RFID devices by associating a middleware server network address or names with the network addresses of the RFID devices. Preferred methods also provide for redundancy of middleware servers and dynamic re-assignment of RFID devices from an unavailable middleware server to an available middleware server.

38 Claims, 15 Drawing Sheets

U.S. PATENT DOCUMENTS

| | | | |
|---|---|---|---|
| 7,129,837 | B2 | 10/2006 | Shannon et al. |
| 7,205,897 | B2 | 4/2007 | Lin |
| 2001/0028308 | A1 | 10/2001 | De La Huerga |
| 2002/0016739 | A1 | 2/2002 | Ogasawara |
| 2002/0161907 | A1 | 10/2002 | Moon |
| 2004/0021569 | A1 | 2/2004 | Lepkofker et al. |
| 2004/0061646 | A1 | 4/2004 | Andrews et al. |
| 2004/0069852 | A1 | 4/2004 | Seppinen et al. |
| 2004/0100383 | A1 | 5/2004 | Chen et al. |
| 2004/0108795 | A1 | 6/2004 | Meek et al. |
| 2004/0128389 | A1 | 7/2004 | Kopchik |
| 2004/0257202 | A1 | 12/2004 | Coughlin et al. |
| 2005/0021626 | A1 | 1/2005 | Prajapat et al. |
| 2005/0093679 | A1 | 5/2005 | Zai et al. |
| 2005/0099270 | A1 | 5/2005 | Diorio et al. |
| 2005/0199716 | A1 | 9/2005 | Shafer et al. |
| 2005/0209947 | A1 | 9/2005 | Shafer |
| 2005/0252957 | A1 | 11/2005 | Howarth et al. |
| 2005/0252970 | A1 | 11/2005 | Howarth et al. |
| 2005/0252971 | A1* | 11/2005 | Howarth et al. ............. 235/451 |
| 2005/0253717 | A1 | 11/2005 | Howarth et al. |
| 2005/0253718 | A1 | 11/2005 | Droms et al. |
| 2005/0253722 | A1 | 11/2005 | Droms et al. |
| 2005/0264420 | A1 | 12/2005 | Vogel et al. |
| 2006/0005035 | A1 | 1/2006 | Coughlin |
| 2006/0010086 | A1* | 1/2006 | Klein ......................... 705/410 |
| 2006/0033606 | A1 | 2/2006 | Howarth et al. |
| 2006/0044111 | A1 | 3/2006 | Kollar et al. |
| 2006/0091999 | A1* | 5/2006 | Howarth .................... 340/10.3 |
| 2006/0253590 | A1* | 11/2006 | Nagy et al. ................. 709/226 |
| 2006/0266832 | A1* | 11/2006 | Howarth et al. ............. 235/451 |
| 2007/0013518 | A1* | 1/2007 | Howarth ................. 340/572.1 |
| 2007/0027966 | A1 | 2/2007 | Singhal et al. |
| 2007/0080784 | A1* | 4/2007 | Kim et al. ................. 340/10.1 |

OTHER PUBLICATIONS

Johnson, R., *TFTP Server Address DHCP Option draft-raj-dhc-tftp-addr-option-00.txt*, Internet-Draft, Feb. 6, 2005, 7 pages.

Littlefield, J., *Vendor-Identifying Vendor Options for Dynamic Host Configuration Protocol version 4 (DPHCPv4)*, RFC 3925, Oct. 2004, 9 pages.

Schulzrinne, H., Dynamic Host Configuration Protocol (DHCPv4 and DHCPv6) Option for Civic Addresses Configuration Information, draft-ietf-geopriv-dhcp-civil-05, Internet-Draft, Feb. 19, 2004.

Polk, J., et al., Dynamic Host Configuration Protocol Option for Coordinate-based Location Configuration Information, RFC 3825, Jul. 2004, 15 pages.

AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005, 3 pages.

WhereNet, Products, http://wherenet.com/products_main.html, printed Apr. 16, 2005, 2 pages.

EPCglobal Tag Data Standards Version 1.1 Rev.1.24, EPCglobal, Standard Specification, Apr. 1, 2004, 78 pages.

Global Location Number (GLN) Implementation Guide, Uniform Code Council, Inc., May 2002, 13 pages.

The Global Language of Business, retrieved from the internet: http://www.ean-int.org/locations.html, [retrieved Mar. 24, 2005], 5 pages.

"Cisco Application-Oriented Networking: A Network-Based Intelligent Message Routing System", http://www.cisco.com/en/US/products/ps6438/products_data_sheet0900aecd802c1f9c.html Data Sheet, Cisco Systems, Inc., Jul. 13, 2005, pp. 1-7.

"Cisco Catalyst 6500 Series Application-Oriented Networking Module", http://www.cisco.com/en/US/products/ps6438/products_data_sheet0900aecd802c1fe9.html Data Sheet, Cisco Systems, Inc. Jul. 13, 2005, pp. 1-3.

"Cisco Application-Oriented Networking—A Network Embedded Intelligent Message Routing System", http://www.cisco.com/en/US/products/ps6438/prod_bulletin0900aecd802c201b.html Product Bulletin No. 2886, Cisco Systems, Inc. Jul. 13, 2005, pp. 1-3.

"Cisco Catalyst 6500 Series Application-Oriented Networking Module: Large Photo", Photo, Retrieved from the internet: http://www.cisco.com/en/US/products/ps6448/prod_view_selector.html [Retrieved Jul. 13, 2005], Cisco Systems, Inc. 1 page.

"*The EPCglobal Architecture Framework*" EPCglobal Final Version of Jul. 1, 2005, pp. 1-53.

Girardot, Marc and Sundaresan, Neel, "*Millau: an encoding format for efficient representation and exchange of XML over the web*" [Retrieved Jan. 31, 2005]. Retrieved from the ineternet: http:www9.org/w9cdrom/154/154.html 25 pages.

Fujitsu Limited, et al., "*Web Services Reliability (WS-Reliability) Ver1.0*", Jan. 8, 2003. pp. 1-45.

Biloruset, Ruslan et al., "*Web Services Reliable Messaging Protocol (WS-ReliableMessaging)*", Mar. 2004, pp. 1-40.

Mockapetris, P., "*Domain Names—Concepts and Facilities*", RFC 1034, Nov. 1987, 43 pages.

International Search Report dated Jul. 13, 2006, from (related) International Application No. PCT/US05/16319, 5 pp. including Notification of Transmittal (CISCP430WO).

Written Opinion of the International Searching Authority dated Jul. 13, 2006, from (related) International Application No. PCT/US05/16319, 5 pp. (CISCP430WO).

US Office Action mailed Oct. 6, 2006 from (related) U.S. Appl. No. 10/866,506 (CISCP376).

US Office Action mailed Oct. 6, 2006 from (related) U.S. Appl. No. 10/866,285 (CISCP378).

US Office Action mailed Nov. 13, 2006 from (related)U.S. Appl. No. 11/073,245, 12 pp. (CISCP415).

US Office Action mailed Jan. 18, 2007 from (related) U.S. Appl. No. 10/866,507, 4 pp. (CISCP377).

US Office Action mailed Mar. 22, 2007 from (related) U.S. Appl. No. 10/866,506 (CISCP376).

US Office Action mailed Apr. 4, 2007 from (related) U.S. Appl. No. 10/866,285 (CISCP378).

C. Lonvick, *The BSD Syslog Protocol*, RFC 3164, Aug. 2001, 28 pages.

International Search Report, dated Oct. 13, 2005 from related International Application No. PCT/US05/16484, 6 pp. including Notification of Transmittal (CISCP377WO).

Written Opinion of the International Searching Authority, dated Oct. 13, 2005 from related International Application No. PCT/US05/16484, 5 pages (CISCP377WO).

"Simple Network Management Protocol", Internetworking Technologies Handbook, Chapter-56, printed Jul. 14, 2005, 12 pages.

D. Harrington et al, *An architecture for Describing Simple Network Management Protocol (SNMP) Management Frameworks*, RFC 3411, Dec. 2002, 64 pages.

R. Presuhn, Editor, *Version 2 of the Protocol Operations for the Simple Network Management Protocol (SNMP)*, RFC 3416, Dec. 2002, 31 pages.

International Search Report dated Feb. 17, 2006, from related International Application No. PCT/US05/15322, 5 pp. including Notification of Transmittal (CISCP378WO).

Written Opinion of the International Searching Authority dated Feb. 17, 2006, from related International Application No. PCT/US05/15322, 3 pp. (CISCP378WO).

US Office Action mailed Aug. 9, 2006 from related U.S. Appl. No. 10/866,507 (CISCP377).

R. Droms, *Dynamic Host Configuration Protocol*, http://www.ietf.org/rfc/, Bucknell University, Mar. 1997 (RFC 2131), printed Mar. 24, 2005, 43 pages.

S. Alexander et al., *DHCP Options and BOOTP Vendor Extensions*, http://www.ietf.org/rfc/, Silicon Graphics, Inc., Mar. 1997 (RFC 2132), printed Mar. 24, 2005, 32 pages.

G. Stump et al., *The User Class Option for DHCP*, http://www.ietf.org/rfc/, IBM, Nov. 2000 (RFC 3004), printed Mar. 24, 2005, 6 pages.

Y. T'Joens, *DHCP Reconfigure Extension*, http://www.ietf.org/rfc/, Alcatel, Dec. 2001, printed Mar. 24, 2005 (RFC 3203), 6 pages.

M. Patrick, *DHCP Relay Agent Information Options*, http://www.ietf.org/rfc/, Motorola BCS, Jan. 2001 (RFC 3046), printed Mar. 24, 2005, 14 pages.

EPCgl, *Frequently Asked Questions*, http://www.epcglobalinc.com/about/faqs.html, printed Mar. 24, 2005, 9 pages.

U.S. Office Action mailed Jun. 26, 2007 from U.S. Appl. No. 11/195,160 (CISCP451).

Notice of Allowance and Notice of Allowability, mailed Sep. 10, 2007 from U.S. Appl. No. 10/866,506. (CISCP376).

Notice of Allowance and Notice of Allowability, mailed Sep. 28, 2007 from U.S. Appl. No. 10/866,507. (CISCP377).

Notice of Allowance and Notice of Allowability, mailed Sep. 10, 2007 from U.S. Appl. No. 10/866,285. (CISCP378).

Notice of Allowance and Notice of Allowability, mailed Sep. 19, 2007 from U.S. Appl. No. 11/195,160. (CISCP451).

* cited by examiner

DNS Table

| | |
|---|---|
| A.Door235.W14.RFID.cisco.com, | 1.1.1.1 |
| B.Door235.W14.RFID.cisco.com, | 1.1.1.2 |
| C.Door235.W14.RFID.cisco.com, | 1.1.1.3 |
| mw-srv-1.W14.RFID.cisco.com, | 1.1.2.1 |
| mw-srv-2.W14.RFID.cisco.com, | 1.1.2.2 |
| W14.RFID.cisco.com | |

*Fig. 3D*

METHODS AND DEVICES FOR PROVIDING SCALABLE RFID NETWORKS

CROSS-REFERENCES TO RELATED APPLICATIONS

This application claims priority to U.S. Provisional Patent Application No. 60/570,999, entitled "Methods and Devices for Uniquely Provisioning RFID Devices" and filed on May 13, 2004, which is hereby incorporated by reference for all purposes. This application is related to U.S. patent application Ser. No. 10/866,506, entitled "Methods and Devices for Uniquely Provisioning RFID Devices" and filed on Jun. 9, 2004, to U.S. patent application Ser. No. 10/866,507, entitled "Methods and Devices for Locating and Uniquely Provisioning RFID Devices" and filed on Jun. 9, 2004, and to U.S. patent application Ser. No. 10/866,285, entitled "Methods and Devices for Assigning RFID Device Personality" and filed on Jun. 9, 2004 (collectively, the "Cross-Referenced Applications"), all of which are hereby incorporated by reference for all purposes.

BACKGROUND OF THE INVENTION

1. Field of the Invention

The present invention relates to radio frequency identification ("RFID") technology. More particularly, the present invention relates to networks that include RFID devices.

2. Description of the Related Art

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

RFID tags use the Electronic Product Code ("EPC" or "ePC") format for encoding information. An EPC code includes a variable number of bits of information (common formats are 64, 96 and 128 bits), which allows for identification of individual products as well as associated information. As shown in FIG. 1, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is normally a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels. Inductively-coupled RFID tags have acceptable performance levels. These tags include a microprocessor, a metal coil and glass or polymer encapsulating material. Unfortunately, the materials used in inductively-coupled RFID tags make them too expensive for widespread use: a passive button tag costs approximately $1 and a battery-powered read/write tag may cost $100 or more.

Capacitively-coupled RFID tags use conductive ink instead of the metal coil used in inductive RFID tags. The ink is printed on a paper label by an RFID printer, creating a lower-cost, disposable RFID tag. However, conventional capacitively-coupled RFID tags have a very limited range. In recent years, RF engineers have been striving to extend the range of capacitively-coupled RFID tags beyond approximately one centimeter.

In part because of the significant efforts that have been expended in solving the foregoing problems, prior art systems and methods for networking RFID devices are rather primitive. RFID devices have only recently been deployed with standard network interfaces such as Ethernet. Device provisioning for prior art RFID networks is not automatic, but instead requires a time-consuming process for configuring each individual device.

Conventional RFID devices also have a small amount of available memory. A typical RFID device may have approximately 0.5 Mb of flash memory and a total of 1 Mb of overall memory. The small memories of RFID devices place restrictions on the range of possible solutions to the problems noted herein. In addition, an RFID device typically uses a proprietary operating system, e.g., of the manufacturer of the microprocessor(s) used in the RFID device.

Prototype RFID network deployments to date require large human/support intervention to be implemented. RFID devices are being deployed with "static" knowledge of where the device was deployed at original time of deployment. RFID devices are statically configured to a single RFID middleware server (formerly known as a "Savant"). Current implementations require each RFID middleware server to contact RFID devices that have been manually associated with that server. Moreover, such networks do not provide for RFID middleware server redundancy.

For these and other reasons, prior art devices and methods are not suitable for the large-scale deployment of RFID devices, middleware servers and other devices in a network. Methods and devices are needed for migrating first generation RFID systems to scalable RFID networks.

SUMMARY OF THE INVENTION

The Cross-Referenced Applications describe methods and devices that allow for the dynamic location and provisioning of individual RFID devices in a network. According to some implementations of the present invention, RFID devices and middleware servers are automatically provisioned with network addresses and with instructions for sending a request for a middleware server to a middleware server assigner. In some implementations, the middleware server assigner is a load balancer.

A plurality of RFID devices at or near a given location may be dynamically "virtualized" or aggregated. Such a dynamic virtualization may be implemented, for example, by including location data in, or associating location data with, a network address of each RFID device and assigning the same location data to each of the virtualized devices. In some such implementations, the location data are included in a domain name of each RFID device and stored in a DNS table.

In some implementations, a middleware server is associated with a plurality of RFID devices by associating a middleware server network address with the network addresses of the RFID devices. The process of associating a middleware server with RFID devices may involve updating a DNS table entry of an RFID device to add a TXT field indicating the middleware server to which each RFID device is assigned. The TXT field may indicate a middleware server name, fully qualified domain name and perhaps site data. Preferred methods also provide for redundancy of middleware servers and dynamic re-assignment of RFID devices from an unavailable middleware server to an available middleware server.

In some implementations, a DNS entry may be created for the site. The DNS entry for the site allows application software to use DNS resolution to determine the device(s) from which to obtain the required data (e.g., a middleware server associated with the RFID devices).

Some implementations of the invention provide a method of dynamically managing a network. The method includes the following steps: provisioning each of a plurality of radio frequency identification ("RFID") devices in the network; associating each RFID device with one of a plurality of locations; transmitting a middleware server request from provisioned RFID devices; assigning one of a plurality of middleware servers to each of the requesting RFID devices; and associating each of the requesting RFID devices with an assigned middleware server.

The middleware server request may be transmitted to a load balancer. The provisioning step can involve assigning an RFID device network address and a load balancer network address. If so, the method may also include these steps: receiving a request from an application program regarding RFID devices associated with a location; and providing RFID device network addresses for RFID devices associated with the location.

The step of associating each RFID device with one of a plurality of locations may involve forming domain name server ("DNS") entries that include location information for the RFID devices. The location information can include site information, information identifying a portion of a site and/or site access area information.

The provisioning step may include these steps: receiving a provisioning request; automatically identifying an RFID device according to a media access control ("MAC") address and an electronic product code ("EPC") included in the provisioning request; automatically locating the RFID device according to location information included in the provisioning request; and automatically providing the RFID device with a desired functionality according to an identity and a location of the RFID device.

The provisioning step can also include these steps: forming a DHCPDISCOVER request that includes an EPC of an RFID device and location information indicating a location of the RFID device; sending the DHCPDISCOVER request to a Dynamic Host Configuration Protocol ("DHCP") server; and receiving provisioning information from the DHCP server that is specifically intended for the RFID device. The provisioning information can enable a desired functionality according to an identity and a location of the RFID device.

The step of associating the RFID device network address of each of the requesting RFID devices with an address of an assigned middleware server can involve forming DNS TXT entries that indicate middleware server information, each of the TXT entries being associated with a DNS entry for an RFID device.

The method may include the step of providing RFID data to the application program from RFID devices associated with the location. The RFID data can include RFID tag data. The RFID tag data can include product information and/or information about a person. The method may include the step of using the RFID tag data to automatically update a database, to cause a financial account to be debited and/or to update a business plan. The business plan may be, for example, a marketing plan, a manufacturing plan, a distribution plan or a sales plan.

Some embodiments of the invention provide a network. The network includes the following elements: a plurality of RFID devices in various locations of a site; a plurality of middleware servers associated with the site; and an assigner, wherein the RFID devices are provisioned with an RFID device network address, an assigner network address and instructions to send a request to the assigner for a middleware server, and wherein the assigner is configured to assign an RFID device to a middleware server in response to the request.

The assigner may be a type of a load balancer. The network may include a DNS server configured to maintain RFID device network addresses and corresponding location and site information for the RFID devices. The DNS server may be configured to maintain middleware server network addresses and corresponding site information for the middleware servers. A middleware server may update RFID device information in the DNS server to indicate assigned middleware servers.

The network may also include an application server configured to create an entry in the DNS server corresponding to all registered devices of a site. The application server may be further configured to request network addresses for all RFID devices associated with a location and/or to send requests to a middleware server. If so, the middleware server can retrieve RFID device location information and provide the RFID device location information to the application server in response to the application server's request.

Alternative implementations of the invention provide a method of dynamically managing a network. The method includes the following steps: provisioning each of a plurality of RFID devices in the network, wherein the provisioning step comprises providing an RFID device with a designated load balancer; associating each RFID device network address with one of a plurality of locations; causing RFID devices to send a first middleware server request to a designated load balancer; assigning a first middleware server of a plurality of available middleware servers to a first plurality of the requesting RFID devices; associating the RFID device of each of the first plurality of RFID devices with the first middleware server; receiving an indication that the first middleware server is no longer an available middleware server; causing each of the first plurality of RFID devices to send a second middleware server request to the load balancer; assigning a second middleware server of a plurality of available middleware servers to N RFID devices of the first plurality of RFID devices; and associating each of the N RFID devices with the second middleware server.

The indication may be, for example, a loss of communication with the first middleware server or information from a network administrator. The associating steps may include forming DNS TXT entries that indicate middleware server information, each of the TXT entries being associated with a DNS entry for an RFID device.

Some embodiments of the invention provide a computer program for dynamically managing a network. The computer program may be embodied in a machine-readable medium and contains instructions for controlling devices in the network to perform the following steps: provisioning each of a plurality of RFID devices in the network; associating each RFID device with one of a plurality of locations; transmitting a middleware server request from provisioned RFID devices; assigning one of a plurality of middleware servers to each of the requesting RFID devices; and associating each of the requesting RFID devices with an assigned middleware server.

BRIEF DESCRIPTION OF THE DRAWINGS

FIGS. 3B-3E illustrate a DNS table at various stages of the method illustrated in FIG. 3A.

DETAILED DESCRIPTION OF THE INVENTION

Figure 1:
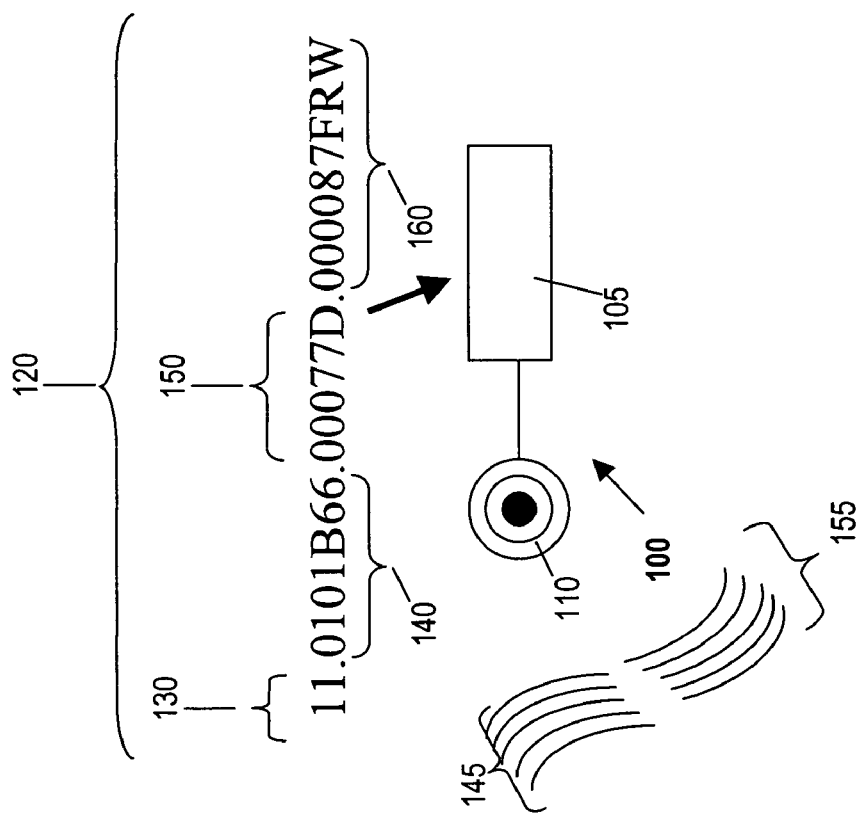
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The Cross-Referenced Applications describe methods and devices that allow for the dynamic location and provisioning of individual RFID devices in a network. RFID devices perform different functions and may interface to the upstream systems differently depending on where they are located. The functions they perform, as well as the unique settings to perform those functions, will be referred to herein as the device "personality." As used herein, "provisioning" a device can include, but is not limited to, providing network configuration, providing personality configuration, incorporating the device into a network database and enabling the device with software (e.g., business process software). The "location" of a device may be stationary or mobile: for example, the location may be a station of an assembly line in a factory or a door of a delivery truck.

A plurality of RFID devices at or near a given location may be "virtualized" or aggregated. For example, the location may be a door, a loading dock, an area of an assembly line, etc. The virtualization may be implemented, for example, by including location data in, or associating location data with, a network address of each RFID device and assigning the same location data to each of the virtualized devices. For example, each RFID device that is deployed near a door (one example of a "location") of a warehouse (one example of a "site") may be virtualized by having a network address that includes location data corresponding with the door and site data corresponding with the warehouse. In some such implementations, the location and site data are included in a domain name of each RFID device and stored in a DNS table as part of a provisioning process.

According to some implementations of the present invention, RFID devices are also provisioned with instructions for sending a request for a middleware server to a middleware server assigner. The assigner determines to what middleware server a requesting RFID device will be assigned. In some implementations, the middleware server assigner is a type of load balancer.

In some implementations, an assigned middleware server is associated with an RFID device by dynamically associating the middleware server's network address(es) with the network address of the RFID device. The middleware server network address may include site data and/or a fully qualified domain name. The process of associating a middleware server with an RFID device may involve updating an entry of a DNS table corresponding to the RFID device to add, remove or modify a TXT field indicating the middleware server to which the RFID device is assigned. The TXT field may include a middleware server name and site data and/or a fully qualified domain name.

In some implementations, a DNS entry may be created for the site. For example, some such implementations provide a two-level lookup process for, e.g., determining all RFID devices deployed at a particular location. The DNS entry for the site allows application software to use DNS resolution to determine the device(s) from which to obtain the required data (e.g., a middleware server associated with the RFID devices). In this example, a DNS resolver for the application server would resolve the IP address of the middleware server. The middleware server returns the IP addresses of the relevant RFID devices.

Figure 2:
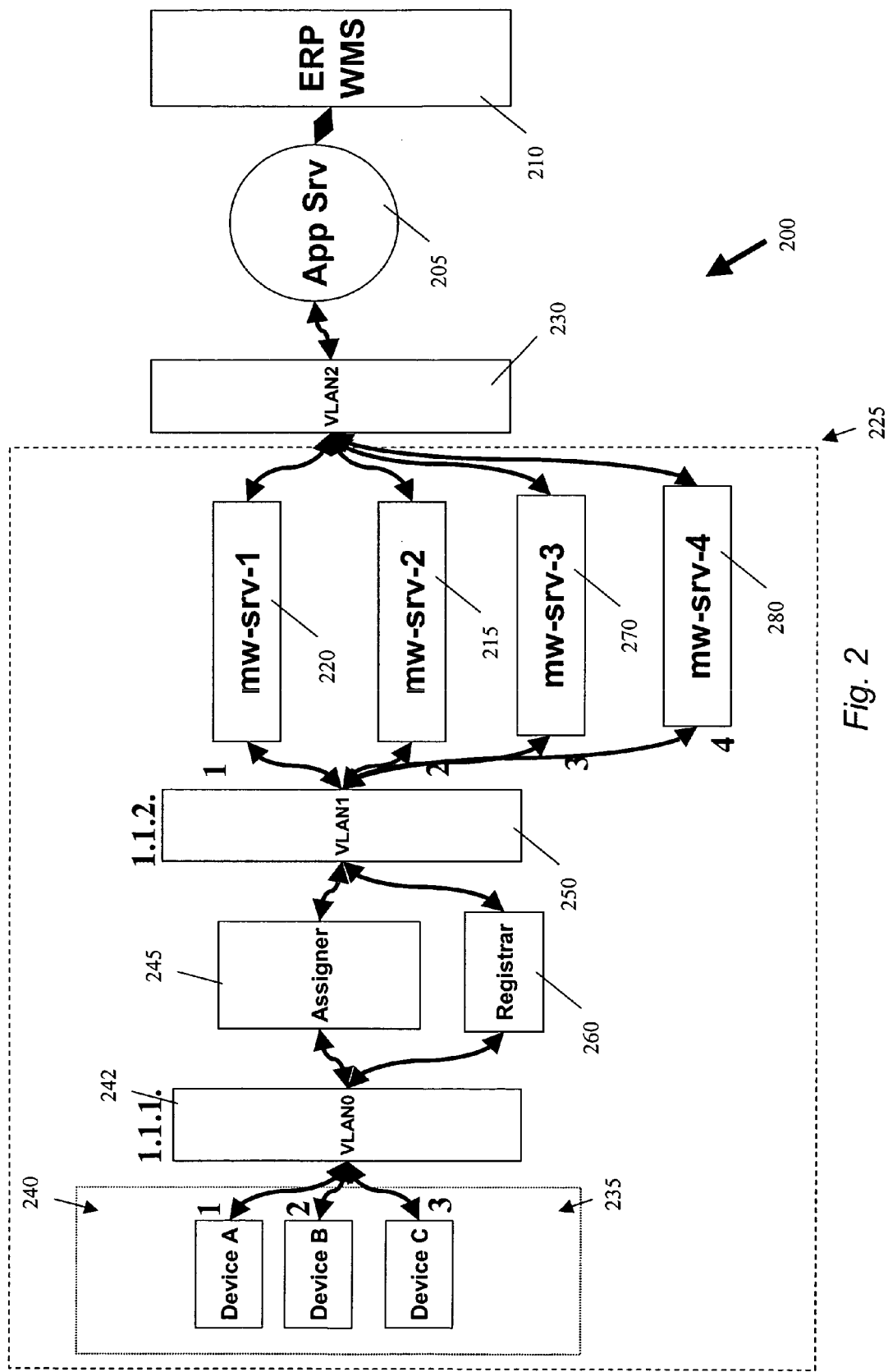
FIG. 2 is a block diagram illustrating a simplified portion of an RFID network of the present invention.

FIG. 2 illustrates a portion of a simplified RFID network 200 that will be used to describe some implementations of the invention. The details of network 200 are purely illustrative. Application server 205 operates according to instructions from application software 210 that resides in a memory device of, or accessible to, application server 205. Application server 205 is in communication with middleware servers 215 and 220 of site 225, via a virtual local area network ("VLAN") 230 in this example.

Site 225, which is "Warehouse 14" in this example, includes numerous locations at which RFID devices are deployed. One such location is door 235, where a plurality of RFID devices 240 are positioned. RFID devices 240 are in communication with middleware server assigner 245 via VLAN 242. Middleware servers 215 and 220 communicate with assigner 245 and registrar 260 via VLAN 250. As will be discussed in more detail below, in some preferred implementations assigner 245 is a type of load balancer.

Figure 3A:
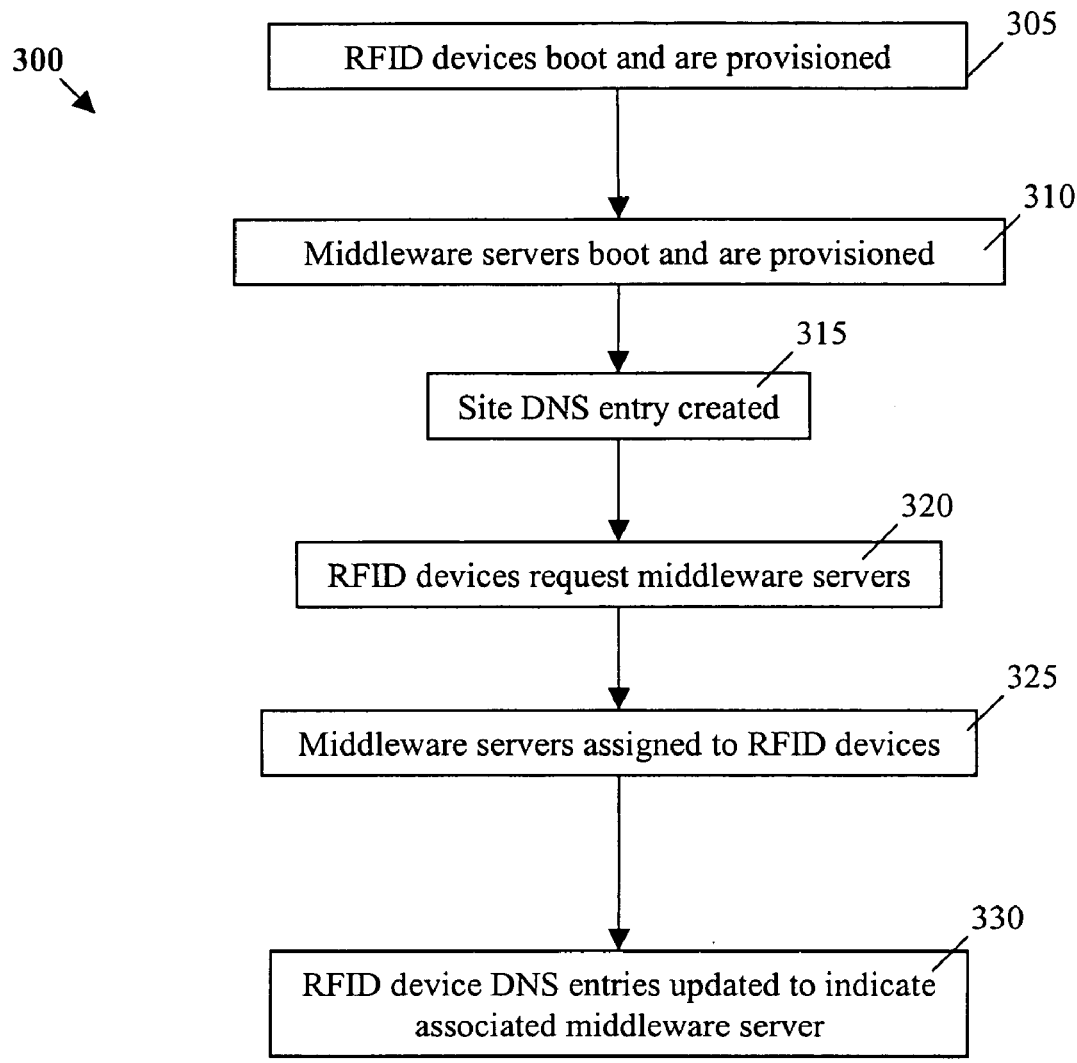
FIG. 3A is a flow chart that provides an overview of a method of the present invention.

FIG. 3A is a flow chart that provides an overview of method 300 according to the present invention. Those of skill in the art will appreciate that the steps of the methods discussed herein, including method 300, need not be performed (and in some implementations are not performed) in the order shown. Moreover, some implementations of the methods discussed herein may include more or fewer steps than those shown, e.g., in FIG. 3A.

In step 305, RFID devices in a network boot up and are provisioned. The RFID devices may be dynamically provisioned, for example, according to the methods described in the Cross-Referenced Applications. In addition to the types of provisioning described in the Cross-Referenced Applications, the RFID devices are also provided with the network address of a middleware server assigner and instructions for sending a request for a middleware server to the assigner.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes. In some preferred implementations, an EPC corresponding to an RFID device is put inside a DHCP request sent from the RFID device to a DHCP server. The EPC uniquely identifies the RFID device.

Some implementations employ Domain Name Service ("DNS") and dynamic DNS ("DDNS") to allow yet easier identification of RFID devices. RFC 1034 and RFC 1035 are hereby incorporated by reference and for all purposes.

Figure 3B:
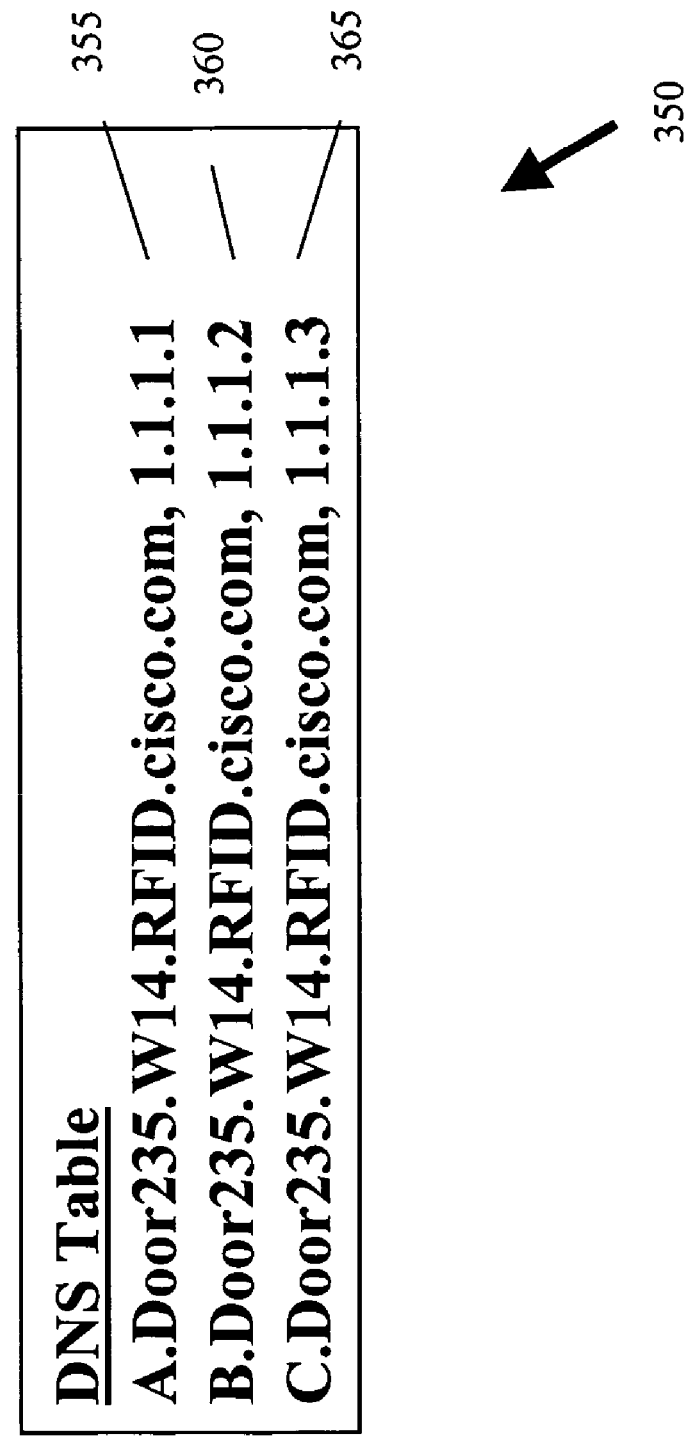

FIG. 3B illustrates one format for DNS entries in a DNS table 350 for RFID devices 240. In this example, DNS Table 350 is stored in 260, but DNS Table 350 could be stored elsewhere in network 200. In DNS table 350, the DNS entries have the following format:

<Device>.<Location>.<Site>.RFID.<Domain>

Accordingly, entry 355 for RFID device A of FIG. 2 includes domain name "A.Door235.W14.RFID.cisco.com" and the associated IP address. Corresponding entries 360 and 365 are formed for RFID devices B and C. One of skill in the art will readily understand that this format is merely one example and that many other suitable formats could be used for this purpose.

Figure 3C:
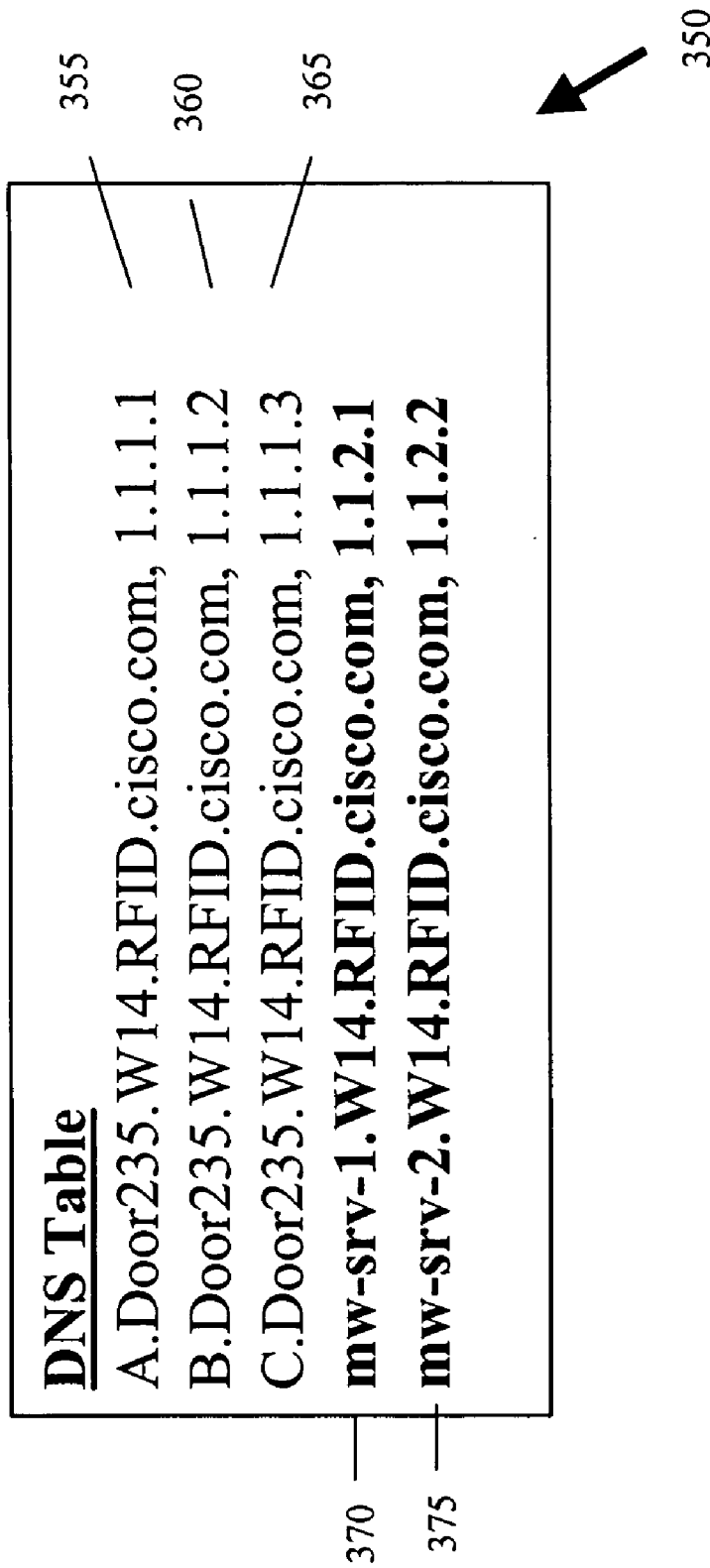
Figure 3E:
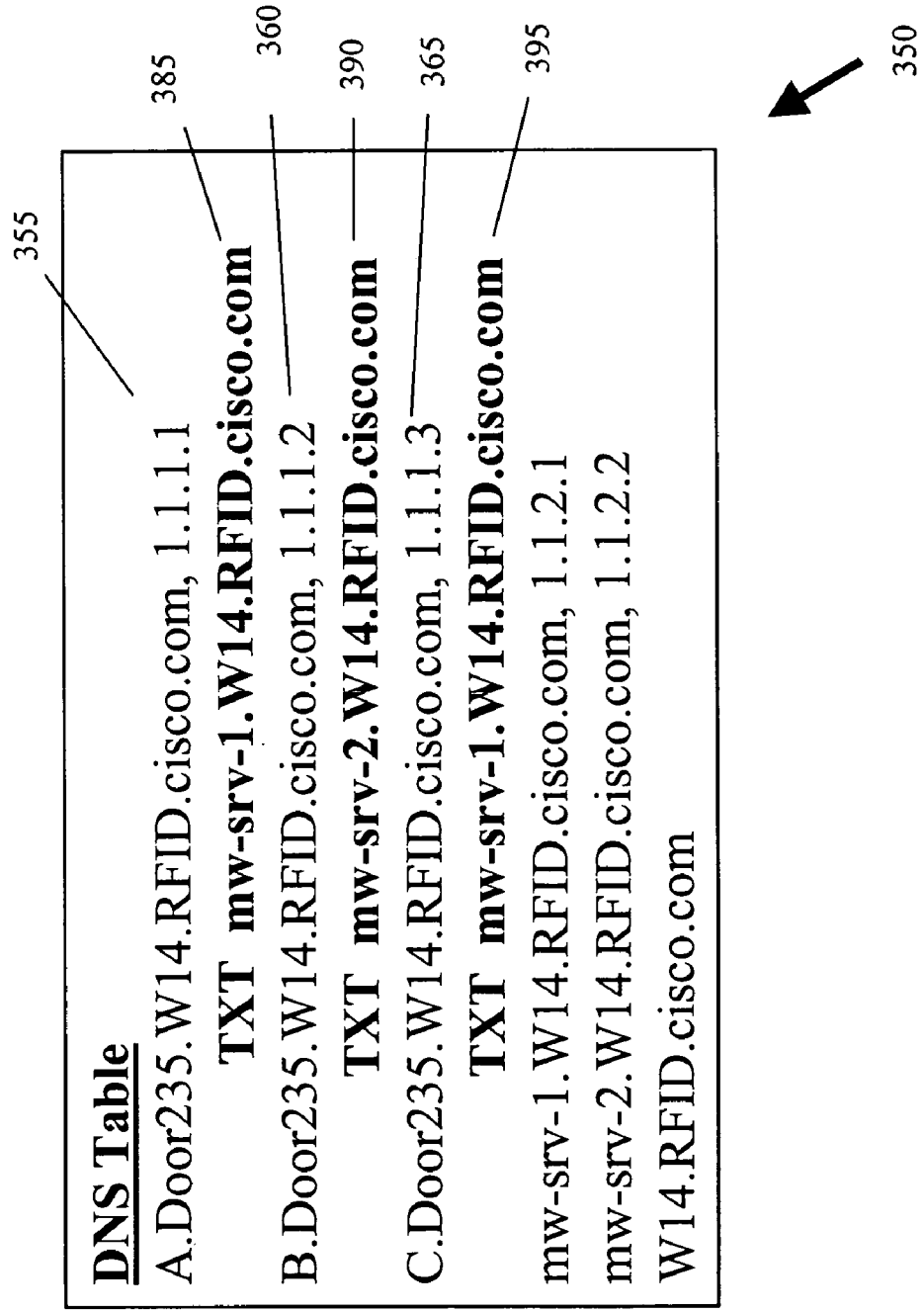

Referring again to FIG. 3A, in step 310 middleware servers in the network boot up and are provisioned. This process could be a manual process or an automated process, e.g., similar to that described in the Cross-Referenced Applications. As part of the provisioning process, middleware servers 215 and 220 are provided with network addresses, including domain names and IP addresses. Accordingly, entries 370 and 375 are added to DNS table 350, as shown in FIG. 3C.

In step 315, a site DNS is created for Warehouse 14. This entry could be created by application server 205, by another device or manually. Entry 380 of FIG. 3D illustrates such a DNS entry, in the format <site>.RFID.<domain>. In step 320, RFID devices request middleware servers. Here, the RFID devices transmit requests for middleware servers to assigner 245. Assigner 245 determines that RFID devices A and C will be associated with middleware server 220 and RFID device B will be associated with middleware server 215 (step 325).

In step 330, middleware servers update the DNS entry for each RFID device with identification information for the middleware server. In this example, the DNS entry for each RFID device is updated with a TXT record that states the domain name of the associated middleware server. Accordingly, TXT record 385 ("TXT mw-srv-1.W14.RFID.cisco.com") is added to DNS entry 355 for RFID device A. Similarly, TXT record 390 ("TXT mw-srv-2.W14.RFID.cisco.com") is added to DNS entry 360 for RFID device B and TXT record 395 ("TXT mw-srv-1.W14.RFID.cisco.com") is added to DNS entry 365 for RFID device C. Preferably, the same procedure applies if an RFID device is added/replaced after other RFID devices in the network have been initialized, provisioned, etc., as described above.

Assigner 245 could be implemented in various ways, e.g., as a stand-alone device, as hardware and/or software incorporated into a module of another network device, etc. The network device could be, for example, a switch (e.g., a Catalyst 6500 switch provided by Cisco) or a middleware server.

In this example, assigner 245 is a type of load balancer. However, assigner 245 preferably does not re-allocate RFID devices to other middleware servers as frequently as a normal TCP load balancer would re-route network traffic. Instead, assigner 245 preferably re-allocates RFID devices to other middleware servers only when certain conditions exist, e.g., when devices boot up, during a maintenance cycle, when middleware servers are added to the network, etc. Otherwise, the associations between middleware servers and RFID devices would frequently change and the new associations would need to be communicated to other parts of network 200 (e.g., to application server 205).

According to some implementations, the protocol used for the query/response between the RFID device and the assigner differs from the protocol used in routine communications on the RFID network. In some such implementations of the load balancer described herein, the protocol is one used by conventional TCP load balancers. The RFID device may or may not know about the separate existence of the load balancer. In some preferred implementations, the RFID device treats the load balancer as the RFID middleware server.

Figure 4:
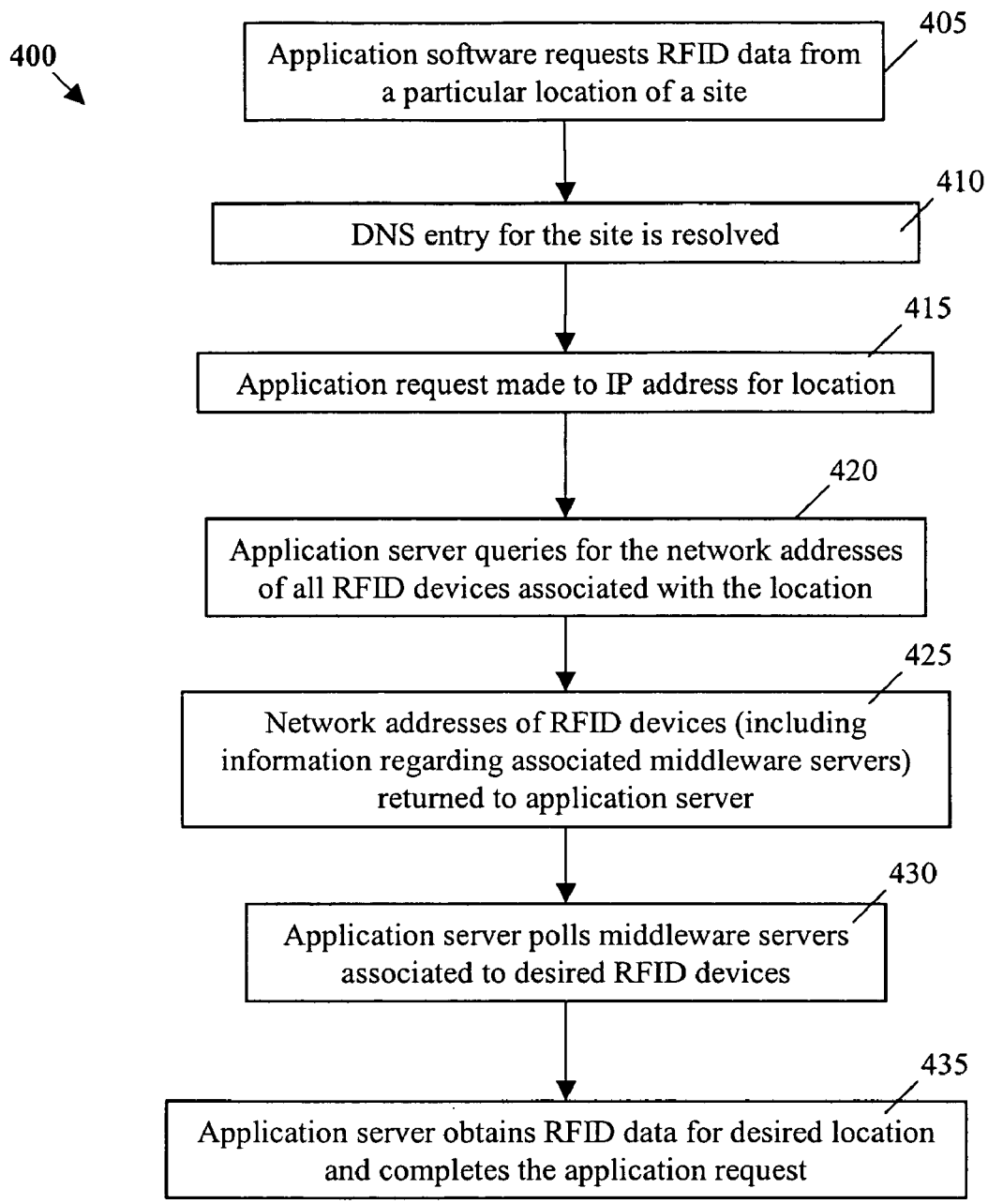
FIG. 4 is a flow chart that provides an overview of another method of the present invention.

FIG. 4 is a flowchart that outlines method 400 for obtaining RFID data from a location according to some implementations of the present invention. In step 405, application software 210 requests RFID data from a location. In this example, the location is location 235, which is a door of Warehouse 14. The DNS entry 380 for this site is resolved (step 410) and an application request is made for the IP address for W14, Door 235 (step 415).

In response, application server 205 queries for the network addresses of all RFID devices deployed at door 235, e.g., "*.Door235.W14.RFID.cisco.com." (Step 420.) (The asterisk here signifies a search for all entries that match or have entries related to Door 235.) Network addresses for these RFID devices (including the TXT records that indicate associated middleware servers) are returned to application server 205 (step 425). Accordingly, the application server now knows the middleware server associated with each RFID device deployed at door 235 of Warehouse 14. The application server can then poll these middleware servers (step 430) in order to obtain RFID data for door 235 and complete the application request. (Step 435.)

Figure 5:
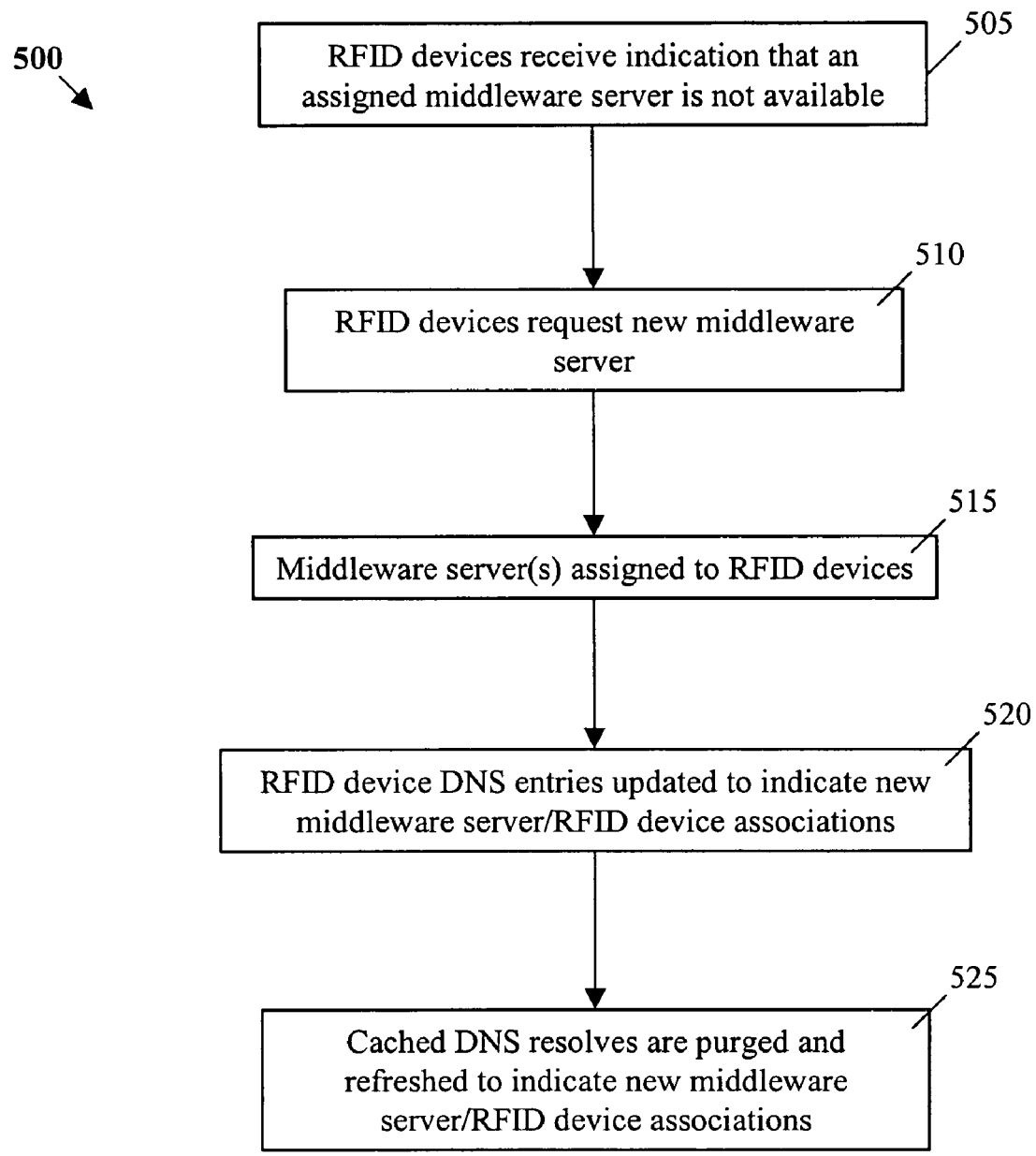
FIG. 5 is a flow chart that provides an overview of still another method of the present invention.

Some methods of the present invention provide for redundancy of middleware servers and dynamic re-assignment of RFID devices from an unavailable middleware server to one or more available middleware servers. The flow chart of FIG. 5 outlines one such method 500 according to the present invention. Method 500 begins after RFID devices and associated middleware servers have previously been initialized, provisioned according to the present invention. For example, such devices may be in the condition that would exist upon completion of step 330 of method 300.

In step 505, one or more RFID devices receive an indication that a middleware server with which they had been associated will no longer be available. This indication could manifest in many ways. For example, before taking a middleware server off line for maintenance and/or a software upgrade, a network administrator could send a signal to the RFID devices indicating that the middleware server is no longer available. Alternatively, the RFID devices may simply determine that a previously-established connection with the middleware server has gone down. In this example, middleware server 220 has been taken off line and RFID devices A and C determine that their connection with middleware server 220 has gone down. Similarly, RFID devices at other locations of site 225 also determine that their connection with middleware server 220 has gone down.

In response, the RFID devices request another middleware server (step 510). RFID devices A and C may, for example, send a second middleware server request to assigner 245. In step 515, assigner 245 assigns an available middleware server to each of the RFID devices that have sent a second middleware server request. In this example, middleware servers 270 and 280 are both available. Assigner 245 assigns middleware servers in an appropriate fashion, e.g., taking into account the current demands of middleware servers 270 and 280.

In this example, middleware server 270 is assigned to RFID device A and middleware server 280 is assigned to RFID device C. Accordingly, TXT entries 385 and 395 in DNS table 350 (corresponding to RFID device A and C, respectively) are updated to indicate the new middleware server/RFID device associations. (Step 520.) Here, entries 385 and 395 are revised to read "TXT mw-srv-3.W14.RFID.cisco.com." Other RFID devices of site 225 that were previously assigned to middleware server 220 are assigned either to middleware server 270 or 280 and their corresponding TXT entries are also updated.

Other components of network 200 need to be made aware of the new RFID device/middleware server associations. For example, the cached DNS resolves of application server 205 corresponding to the prior RFID device/middleware server associations need to be purged and the caches need to be refreshed with the new RFID device/middleware server associations (step 525). In some implementations, when an application server can no longer communicate with a middleware server and/or an RFID device, the application server will make a query for the device and use the results of this query to refresh its cache of DNS entries.

Alternatively (or additionally), purging and refreshing of cashed DNS resolves is controlled by a time to live ("TTL") indication received from a middleware server with the RFID device/middleware server associations. According to some such alternative implementations, after the TTL has run the application server makes a query for RFID device/middleware server associations and uses the results of this query to refresh its cache of DNS entries.

If middleware server 220 is later brought back on line, it could be initialized, provisioned, etc. (e.g., as described above). In some implementations, middleware server 220 notifies assigner 245 that it is back online and assigner 245 updates a table/database of available middleware servers for site 225. RFID devices could subsequently be assigned to middleware server 220, e.g., as described above.

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Using the devices and methods of the present invention, RFID tags and associated RFID devices (such as RFID readers and printers) can form part of a network for tracking a product and its history. For example, instead of waiting in a checkout line to purchase selected products, a shopper who wishes to purchase products bearing RFID tags can transport the products through a door that has multiple RFID readers deployed nearby. The readers may be virtualized and data from the virtualized readers may be obtained by application software. For example, the application software may obtain EPC information regarding the products and can use this information to update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that are relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Figure 6:
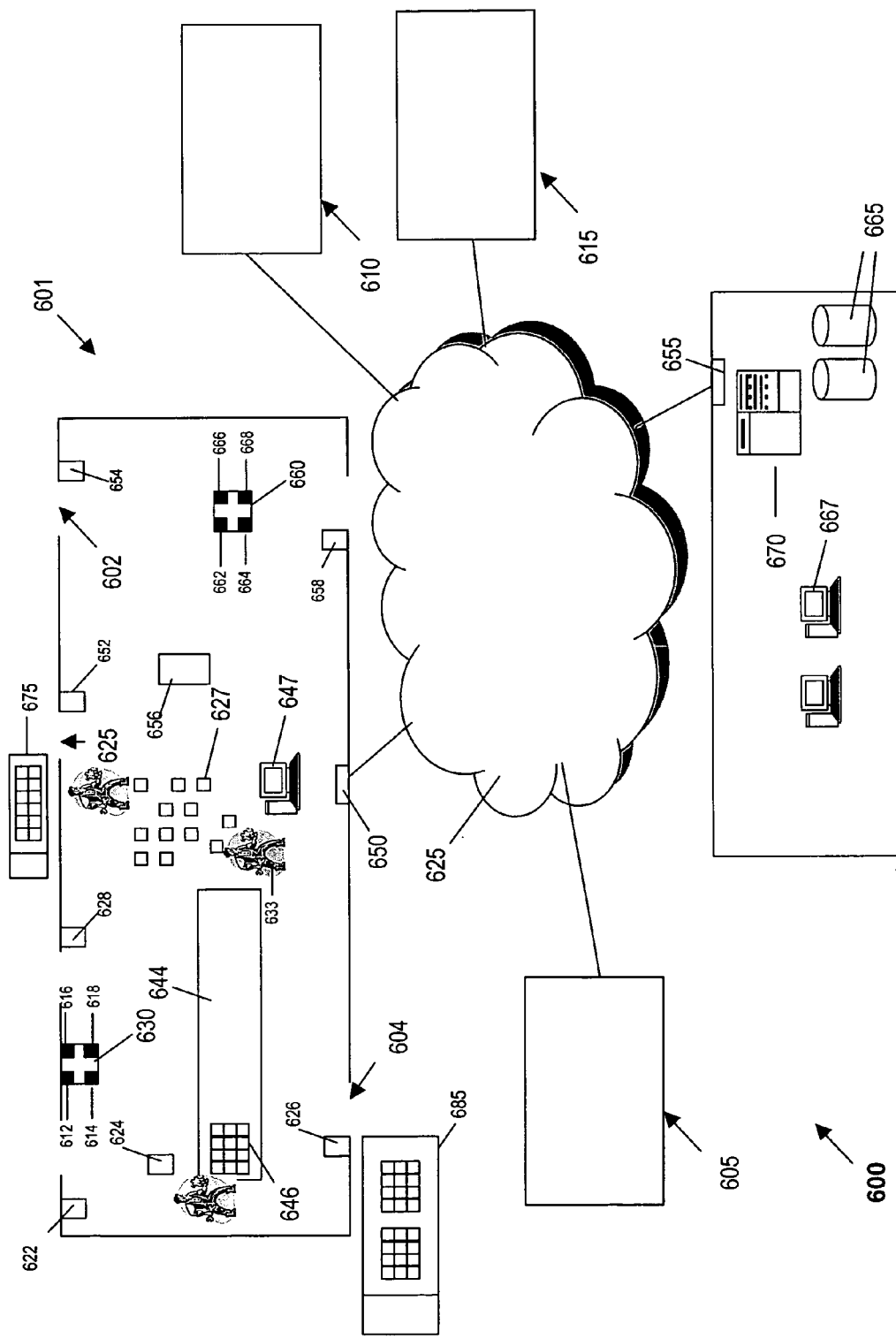
FIG. 6 illustrates an exemplary RFID network according to the present invention.

Some aspects of the invention use a combination of EPC code information and combine them with versions of existing networking standards for identifying, locating and provisioning RFID devices, such as RFID readers and RFID printers, that are located in a network. An example of such a network is depicted in FIG. 6. Here, RFID network 600 includes warehouse 601, factory 605, retail outlet 610, financial institution 615 and headquarters 620. As will be appreciated by those of skill in the art, network 600 could include many other elements and/or multiple instances of the elements shown in FIG. 6. For example, network 600 could include a plurality of warehouses, factories, etc.

In this illustration, products 627 are being delivered to warehouse 601 by truck 675. Products 627, which already include RFID tags, are delivered through door 625. In this example, RFID reader 652 is connected to port 662 of switch 660. Here, switches 630 and 660 are connected to the rest of RFID network 600 via gateway 650 and network 625. Network 625 could be any convenient network, but in this example network 625 is the Internet. RFID reader 652 reads each product that passes through door 625 and transmits the EPC code corresponding to each product on RFID network 600.

RFID tags may be used for different levels of a product distribution system. For example, there may be an RFID tag for a pallet of cases, an RFID tag for each case in the pallet and an RFID tag for each product. Accordingly, after products 627 enter warehouse 601, they are assembled into cases 646. RFID printer 656 makes an RFID tag for each of cases 646. In this example, RFID printer 656 is connected to port 666 of switch 660. RFID printer 656 could operate under the control of PC 647 in warehouse 601, one of PCs 667 in headquarters 620, or some other device.

RFID reader 624, which is connected to port 614, reads the EPC code of each case 646 and product 627 on conveyor belt 644 and transmits this information on network 600. Similarly, RFID reader 626, which is connected to port 616, reads the EPC code of each case 646 and product 627 that exits door 604 and transmits this information on network 600. Cases 646 are loaded onto truck 685 for distribution to another part of the product chain, e.g., to retail outlet 610.

Each of the RFID devices in network 600 preferably has a "personality" suitable for its intended use. For example, device 652 could cause reassuring tone to sound and/or a green light to flash if an authorized person or object enters door 625. However, device 652 might cause an alarm to sound and/or an alert to be sent to an administrator on network 600 if a product exits door 625 or an unauthorized person enters or exits door 625.

Figure 7:
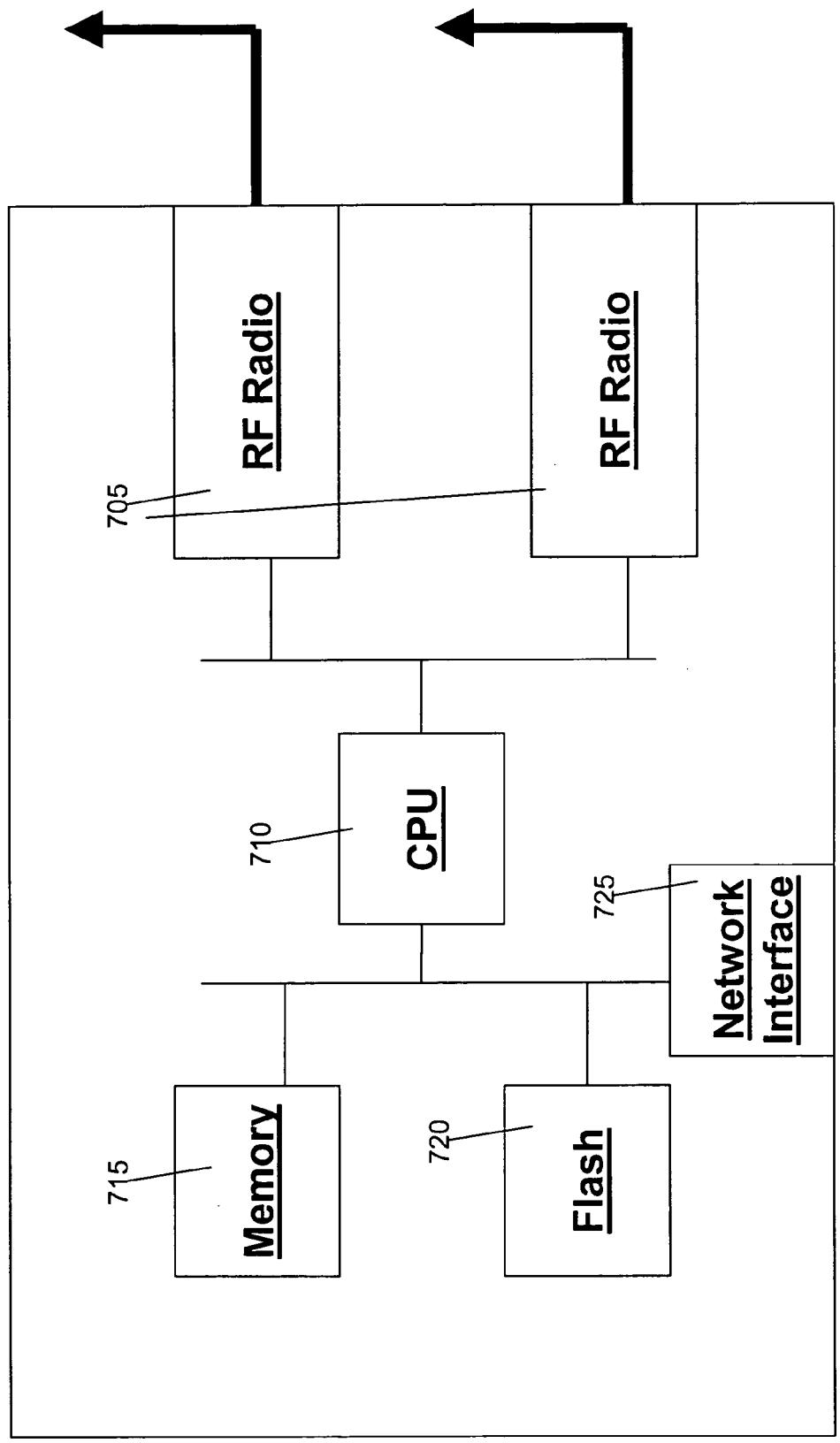
FIG. 7 is a block diagram of an exemplary RFID reader that may be configured to perform some methods of the present invention.

FIG. 7 illustrates an RFID reader that can be configured to perform methods of the present invention. RFID reader 700 includes one or more RF radios 705 for transmitting RF waves to, and receiving modulated RF waves from, RFID tags. RF radios 705 provide raw RF data that is converted by an analog-to-digital converter (not shown) and conveyed to other elements of RFID reader 700. In some embodiments, these data are stored, at least temporarily, by CPU 710 in memory 715 before being transmitted to other parts of RFID network 600 via network interface 725. Network interface 725 may be any convenient type of interface, such as an Ethernet interface.

Flash memory 720 is used to store a program (a "bootloader") for booting/initializing RFID reader 700. The bootloader, which is usually stored in a separate, partitioned area of flash memory 720, also allows RFID reader 700 to recover from a power loss, etc. In some embodiments of the invention, flash memory 720 includes instructions for controlling CPU 710 to form "DHCPDISCOVER" requests, as described below with reference to FIG. 6, to initiate a provisioning/configuration cycle. In some implementations, flash memory 720 is used to store personality information and other configuration information obtained from, e.g., a DHCP server during such a cycle.

However, in preferred implementations, such information is only stored in volatile memory 415 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 715. Updates may be instigated by the central server or selected, trusted devices. New versions of the image file (e.g., the running, base image necessary to operate the RFID device) are copied into flash memory 720. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 8:
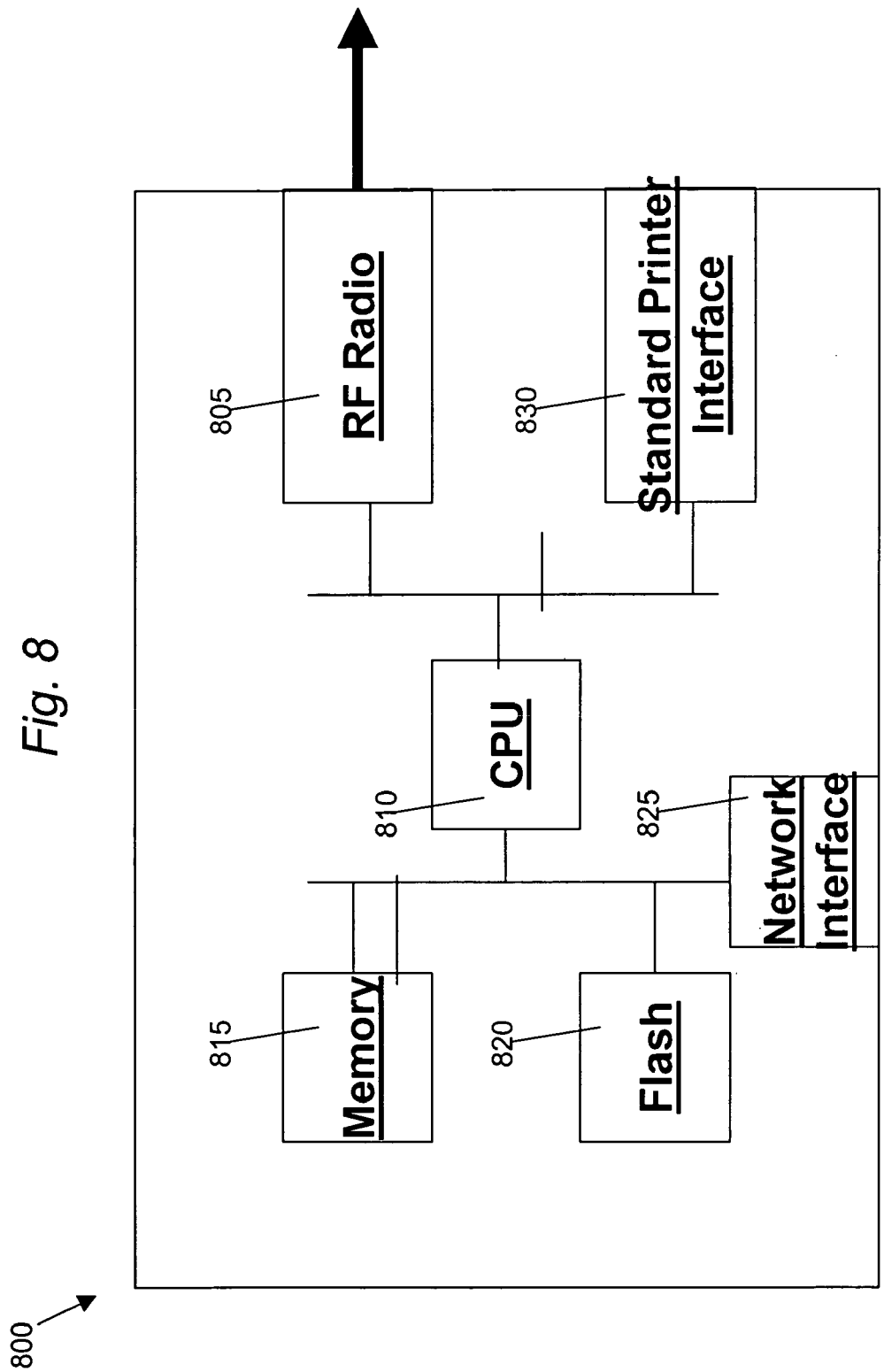
FIG. 8 is a block diagram of an exemplary RFID printer that may be configured to perform some methods of the present invention.

FIG. 8 is a block diagram illustrating an exemplary RFID printer 800 that may be configured to perform some methods of the present invention. RFID printer 800 has many of the same components as RFID reader 700 and can be configured in the same general manner as RFID reader 700.

RFID printer also includes printer interface 830, which may be a standard printer interface. Printer interface prints a label for each RFID tag, e.g. according to instructions received from network 200 via network interface 825.

RF Radio 805 is an outbound radio that is used to send RF signals to the antenna of an RFID tag under the control of CPU 810, thereby encoding information (e.g. an EPC) on the tag's microprocessor. Preferably, RF Radio 805 then checks the encoded information for accuracy. The RFID tag is sandwiched within the label produced by printer interface 830. Those of skill in the art will realize that the generalized diagram of FIG. 8 will also apply to RFID writers, which are typically high-speed devices that encode the RFID tags on manufacturing lines.

Figure 9:
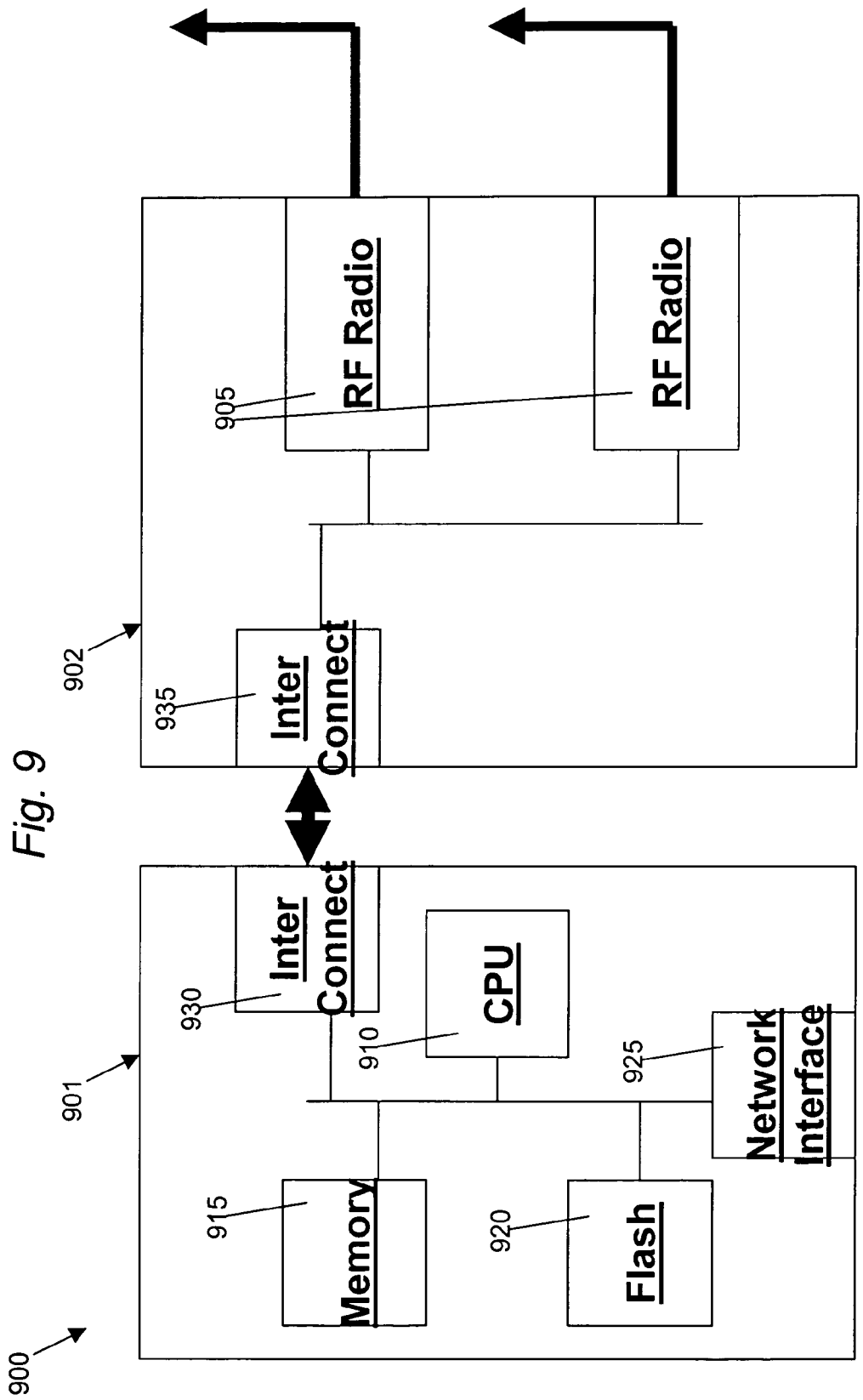
FIG. 9 is a block diagram of an exemplary RFID system that may be configured to perform some methods of the present invention.

FIG. 9 illustrates RFID system 900 that includes control portion 901 and RF radio portion 902. The components of control portion 901 are substantially similar to those described above with reference to FIGS. 7 and 8. Interconnect 930 of control portion 901 is configured for communication with interconnect 935 of RF radio portion 902. The communication may be via any convenient medium and format, such as wireless, serial, point-to-point serial, etc. Although only one RF radio portion 902 is depicted in FIG. 9, each control portion 901 may control a plurality of RF radio portions 902. RFID system 900 may be deployed on a single framework or chassis (e.g., on a forklift) or in multiple chassis.

Figure 10:
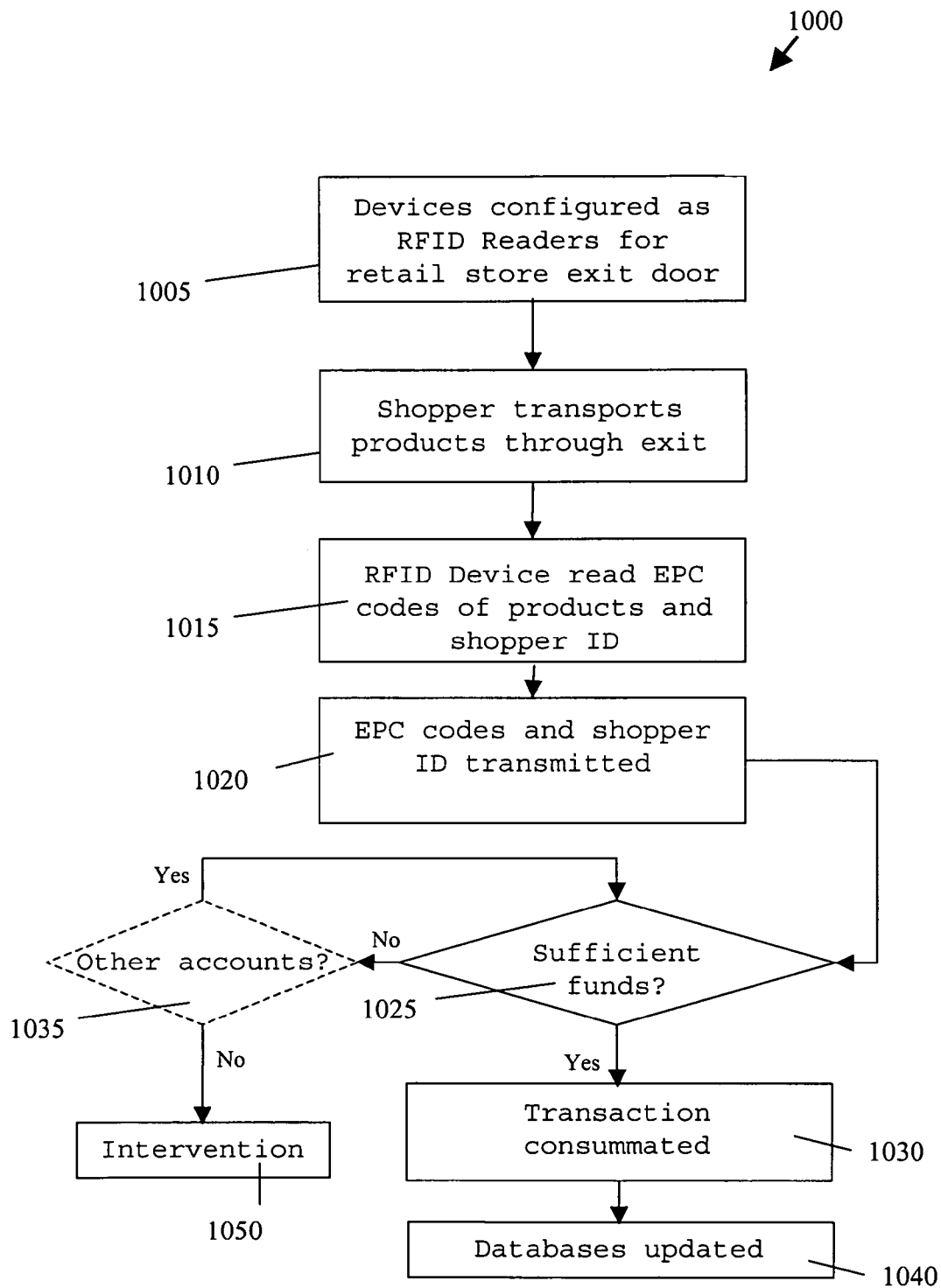
FIG. 10 is a flow chart that provides an overview of some implementations of the present invention.

FIG. 10 is a flow chart that illustrates an exemplary business application of the present invention. Those of skill in the art will appreciate that the example described below with reference to FIG. 10 is but one of many applications of the invention.

In step 1005, a plurality of RFID devices have been provisioned according to one of the previously-described methods. The condition of the RFID network is comparable to that of step 330 in method 300, shown in FIG. 3A and described above. In this example, the RFID devices are RFID readers that are positioned near an exit door of a retail store. Therefore, in the previous steps, the devices have been provisioned with a personality that is appropriate for their role.

In step 1010, a shopper exits the door with a number of selected products. In step 1015, the RFID readers read the RFID tags of each product and extracts the EPC codes and related product information (e.g., the price of each product). Redundant RFID data may be filtered at any convenient part of the network, e.g., by middleware or by application software.

In this example, the RFID readers also read an RFID tag that identifies the shopper and the shopper's preferred account(s) that should be debited in order to purchase the products. For example, the shopper may have an RFID tag embedded in a card, a key chain, or any other convenient place in which this information is encoded. The accounts may be various types of accounts maintained by one or more financial institutions. For example, the accounts may be one or more of a checking account, savings account, a line of credit, a credit card account, etc. Biometric data (e.g., voice, fingerprint, retinal scan, etc.) from the shopper may also be obtained and compared with stored biometric data in order to verify the shopper's identity.

In step 1020, the RFID readers transmit the product information, including the EPC codes, on the RFID network. In this example, the information is sent (e.g., according to instructions in application software) to a financial institution indicated by the shopper's RFID tag.

In step 1025, the financial institution that maintains the shopper's selected account determines whether there are sufficient funds (or whether there is sufficient credit) for the shopper to purchase the selected products. If so, the shopper's account is debited and the transaction is consummated (step 1030).

In this example, the shopper has the option of designating one or more alternative accounts. Accordingly, if the first account has insufficient funds or credit, it is determined (e.g., by a server on the RFID network) whether the shopper has indicated any alternative accounts for making purchases (step 1035). If so, the next account is evaluated in step 1025. If it is determined in step 1035 that there are no additional accounts designated by the shopper, in this example some form of human intervention takes place. For example, a cashier of the retail store could assist the shopper in making the purchases in a conventional manner.

If some or all of the products are purchased, information regarding the purchased products (including the EPC codes) are transmitted on the RFID network. For example, this information is preferably forwarded to one or more devices on the RFID network that are configured to update one or more databases maintained by the retail store or the manufacturers/producers, distributors, wholesalers, etc., of the purchased products (step 1040). In some implementations, information regarding the shopper is also transmitted on the RFID network (e.g., if the shopper has authorized such information to be released). This product information (and optionally shopper information) may be used for a variety of purposes, e.g., in the formation of various types of business plans (e.g., inventory re-stocking, marketing, sales, distribution and manufacturing/production plans).

Figure 11:
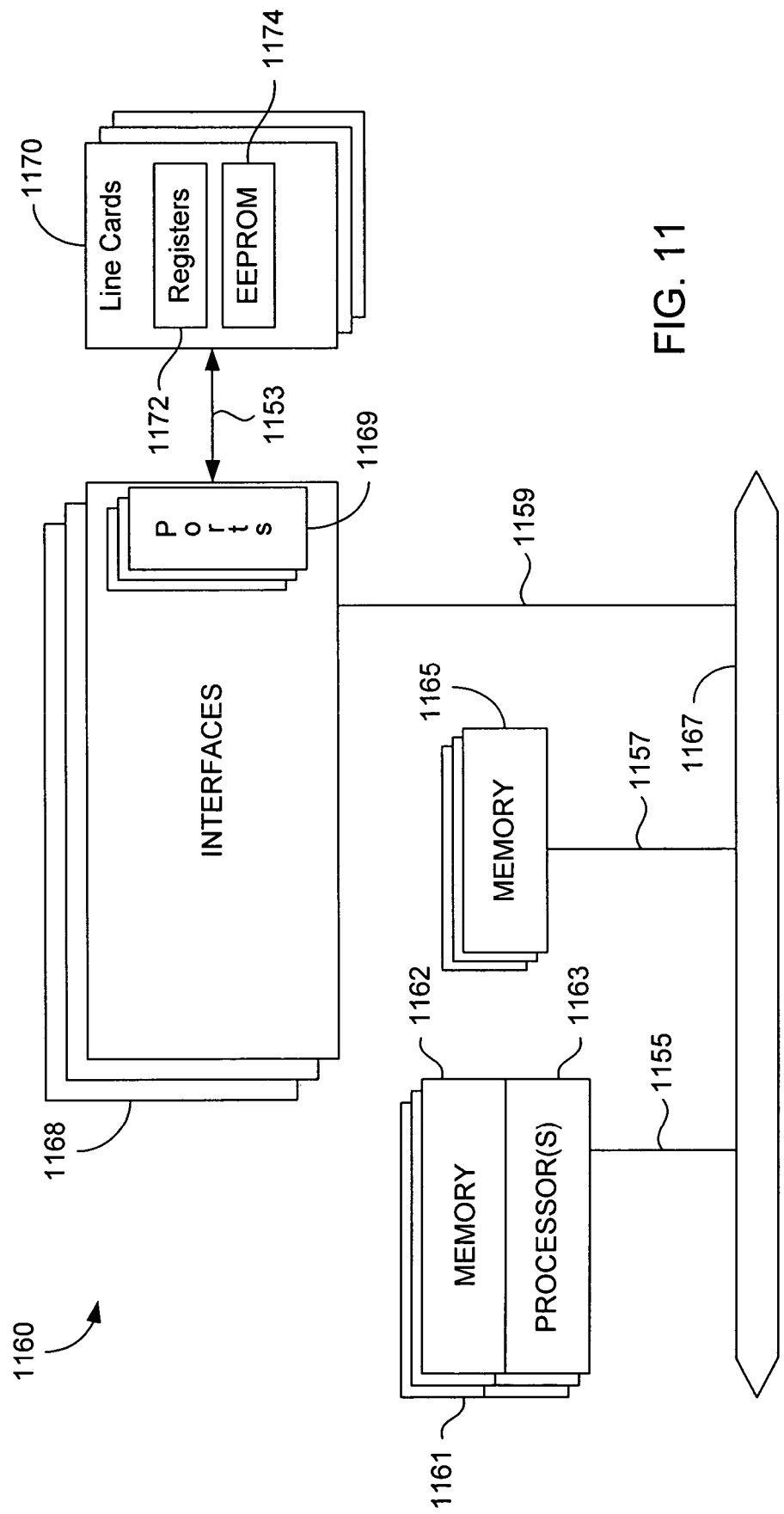
FIG. 11 illustrates an example of a network device that may be configured to implement some methods of the present invention.

FIG. 11 illustrates an example of a network device that may be configured to implement some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor 1174 and, in some instances, volatile RAM. Independent processors 1174 may be, for example ASICs or any other appropriate processors. According to some such embodiments, these independent processors 1174 perform at least some of the functions of the logic described herein. In some embodiments, one or more of interfaces 1168 control such communications-intensive tasks as media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "line cards"). Generally, interfaces 1168 control the sending and receiving of data packets over the network and sometimes support other peripherals used with the network device 1160. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system (e.g. Linux, VxWorks, etc.), and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 11) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

For example, while the present invention involves methods and devices for identifying and provisioning individual RFID devices in a network, many aspects of the present invention can be applied to identifying and provisioning other types of devices in a network. Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options may advantageously be used to implement the present invention.

Accordingly, the present embodiments are to be considered as illustrative and not restrictive, and the invention is not to be limited to the details given herein, but may be modified within the scope and equivalents of the appended claims.

We claim:

1. A method of dynamically managing a network, the method comprising:
provisioning each of a plurality of radio frequency identification ("RFID") devices in the network;
associating each RFID device with one of a plurality of locations;
transmitting a middleware server request from provisioned RFID devices;
assigning one of a plurality of middleware servers to each of the requesting RFID devices; and
associating each of the requesting RFID devices with an assigned middleware server.

2. The method of claim 1, wherein the transmitting step comprises transmitting the middleware server request to a load balancer.

3. The method of claim 1, wherein the provisioning step comprises assigning an RFID device network address and a load balancer network address, further comprising:
receiving a request from an application program regarding RFID devices associated with a location; and
providing RFID device network addresses for RFID devices associated with the location.

4. The method of claim 3, further comprising providing RFID data to the application program from RFID devices associated with the location.

5. The method of claim 4, wherein the RFID data comprise RFID tag data.

6. The method of claim 5, further comprising the step of using the RFID tag data to automatically update a database.

7. The method of claim 5, further comprising the step of using the RFID tag data to cause a financial account to be debited.

8. The method of claim 5, further comprising the step of using the RFID tag data to update a business plan.

9. The method of claim 5, wherein the RFID tag data comprise product information.

10. The method of claim 5, wherein the RFID tag data comprise information about a person.

11. The method of claim 8, wherein the business plan is one of a marketing plan, a manufacturing plan, a distribution plan or a sales plan.

12. The method of claim 1, wherein the step of associating each RFID device with one of a plurality of locations comprises forming domain name server ("DNS") entries that include location information for the RFID devices.

13. The method of claim 12, wherein the location information comprises site information.

14. The method of claim 12, wherein the location information comprises information identifying a portion of a site.

15. The method of claim 12, wherein the location information comprises site access area information.

16. The method of claim 1, wherein the provisioning step comprises:
receiving a provisioning request;
automatically identifying an RFID device according to a media access control ("MAC") address and an electronic product code ("EPC") included in the provisioning request;
automatically locating the RFID device according to location information included in the provisioning request; and
automatically providing the RFID device with a desired functionality according to an identity and a location of the RFID device.

17. The method of claim 1, wherein the provisioning step comprises:
forming a DHCPDISCOVER request that includes an electronic product code ("EPC") of an RFID device and location information indicating a location of the RFID device;
sending the DHCPDISCOVER request to a Dynamic Host Configuration Protocol ("DHCP") server; and
receiving provisioning information from the DHCP server that is specifically intended for the RFID device, the provisioning information enabling a desired functionality according to an identity and a location of the RFID device.

18. The method of claim 1, wherein the provisioning step comprises assigning an RFID device network address and a load balancer network address and wherein the step of associating each of the requesting RFID devices with an assigned middleware server comprises forming domain name server ("DNS") TXT entries that indicate middleware server information, each of the TXT entries being associated with a DNS entry for an RFID device.

19. The method of claim 1, wherein the provisioning step comprises assigning an RFID device network address and a load balancer network address.

20. A network, comprising:
a plurality of RFID devices in various locations of a site;
a plurality of middleware servers associated with the site; and
an assigner, wherein the RFID devices are provisioned with an RFID device network address, an assigner network address and instructions to send a request to the assigner for a middleware server, and wherein the assigner is configured to assign an RFID device to a middleware server in response to the request.

21. The network of claim 20, wherein the assigner is a load balancer.

22. The network of claim 20, further comprising a DNS server configured to maintain RFID device network addresses and corresponding location and site information for the RFID devices.

23. The network of claim 22, wherein the DNS server is configured to maintain middleware server network addresses and corresponding site information for the middleware servers.

24. The network of claim 23, wherein a middleware server updates RFID device information in the DNS server to indicate assigned middleware servers.

25. The network of claim 24, further comprising an application server configured to create an entry in the DNS server corresponding to all registered devices of a site.

26. The network of claim 25, wherein the application server is further configured to request network addresses for all RFID devices associated with a location.

27. The network of claim 25, wherein the application server is configured to send requests to a middleware server.

28. The network of claim 27, wherein the middleware server retrieves RFID device location information and provides the RFID device location information to the application server in response to the application server's request.

29. A method of dynamically managing a network, the method comprising:
provisioning each of a plurality of radio frequency identification ("RFID") devices in the network, wherein the provisioning step comprises providing an RFID device with a designated load balancer;
associating each RFID device network address with one of a plurality of locations;

causing RFID devices to send a first middleware server request to a designated load balancer;

assigning a first middleware server of a plurality of available middleware servers to a first plurality of the requesting RFID devices;

associating the RFID device of each of the first plurality of RFID devices with the first middleware server;

receiving an indication that the first middleware server is no longer an available middleware server;

causing each of the first plurality of RFID devices to send a second middleware server request to the load balancer;

assigning a second middleware server of a plurality of available middleware servers to N RFID devices of the first plurality of RFID devices; and associating each of the N RFID devices with the second middleware server.

30. The method of claim 29, wherein the associating steps comprise forming domain name server ("DNS") TXT entries that indicate middleware server information, each of the TXT entries being associated with a DNS entry for an RFID device.

31. The method of claim 29, wherein the indication comprises a loss of communication with the first middleware server.

32. The method of claim 29, wherein the indication comprises information from a network administrator.

33. A radio frequency identification ("RFID") network, comprising:

means for provisioning each of a plurality of radio frequency identification ("RFID") devices in the network;

means for associating each RFID device with one of a plurality of locations;

means for transmitting a middleware server request from provisioned RFID devices;

means for assigning one of a plurality of middleware servers to each of the requesting RFID devices; and means for associating each of the requesting RFID devices with an assigned middleware server.

34. The network of claim 33, wherein the transmitting means comprises means for transmitting the middleware server request to a load balancer.

35. The network of claim 33, wherein the provisioning means comprises means for assigning an RFID device network address and a load balancer network address, the network further comprising:

means for receiving a request from an application program regarding RFID devices associated with a location; and means for providing RFID device network addresses for RFID devices associated with the location.

36. The network of claim 33, wherein the means for associating each RFID device with one of a plurality of locations comprises means for forming domain name server ("DNS") entries that include location information for the RFID devices.

37. The network of claim 33, wherein the provisioning means comprises:

means for receiving a provisioning request;

means for automatically identifying an RFID device according to a media access control ("MAC") address and an electronic product code ("EPC") included in the provisioning request;

means for automatically locating the RFID device according to location information included in the provisioning request; and means for automatically providing the RFID device with a desired functionality according to an identity and a location of the RFID device.

38. A computer program for dynamically managing a network, the computer program embodied in a machine-readable medium and containing instructions for controlling devices in the network to perform the following steps:

provisioning each of a plurality of radio frequency identification ("RFID") devices in the network;

associating each RFID device with one of a plurality of locations;

transmitting a middleware server request from provisioned RFID devices;

assigning one of a plurality of middleware servers to each of the requesting RFID devices; and associating each of the requesting RFID devices with an assigned middleware server.

* * * * *